United States Patent [19]

Nwoko

[11] Patent Number: 5,445,858

[45] Date of Patent: Aug. 29, 1995

[54] ATTENUATING PAD

[76] Inventor: Luck I. Nwoko, 4262 E. Capitol St., NE #40, Washington, D.C. 20019

[21] Appl. No.: 74,498

[22] Filed: Jun. 11, 1993

[51] Int. Cl.$^6$ ............................................. B32B 1/04
[52] U.S. Cl. ........................................... 428/71; 5/450; 5/480; 5/481; 5/654; 5/909; 428/72; 428/76; 428/174; 428/178; 428/192; 428/194; 428/212; 428/218; 428/315.9; 428/318.6; 428/319.3; 428/319.7
[58] Field of Search ................ 428/71, 72, 76, 68, 428/192, 174, 178, 194, 212, 218, 315.9, 318.6, 319.3, 319.7, 448, 423.1, 447; 5/450, 480, 481, 909, 654

[56] References Cited

U.S. PATENT DOCUMENTS

| | | | |
|---|---|---|---|
| 4,456,642 | 6/1984 | Burgdorfer | 428/76 |
| 4,753,705 | 6/1988 | Poncy | 428/72 |
| 4,910,060 | 3/1990 | Nakanishi | 428/76 |

*Primary Examiner*—Nasser Ahmad

[57] ABSTRACT

A gel-encapsulating, load-supporting pad construction with an outer sheath provided with extended flanges for attachment purposes is disclosed. The attenuating device further discloses an elastomeric yieldable foam casing between the outer sheath and the encapsulated shock-absorbing or gel member.

29 Claims, 14 Drawing Sheets

ATTENUATING PAD

FIELD OF INVENTION

The present invention relates, in general, to pads and more particularly, to a unique pad with an improved attenuating capacity which is particularly adapted for supporting loads, i.e., bags, garments, shoulder-borne orthotics, luggage handles, etc., in a manner that provides for lateral/tangential distribution of longitudinal stress.

BACKGROUND OF THE INVENTION

Conventional pads with cushioning material, e.g., foam rubber, overtime, suffer from the disadvantage of permanent compression, the deterioration of the cushioning material and the resultant loss of effective resiliency. The present invention overcomes these shortcomings by describing a novel pad which includes a gel-encapsulating insert member which provides shock attenuation.

Consequently, it is an object of the present invention to provide an improved, attenuating pad which will comfortably provide cushioning and which overcomes the deficiencies and disadvantages associated with prior art pads.

More specific objects of the present invention are as follows:

1. To provide an improved pad construction which has an enhanced capacity for shock absorption, and which distributes forces imposed upon the structure more uniformly and comfortably.
2. To provide an improved pad construction which has a unique adaptive capacity.
3. To provide an improved pad construction which expands the load-bearing area of the structure, so as to reduce pin point loading.
4. To provide an improved pad construction which forms a dynamic, self-contouring, load-supporting surface which automatically and instantly shapes and contours itself.
5. To provide an improved pad construction which absorbs localized forces and re-distributes these forces away from the localized area and absorbs them throughout the fluid system.
6. To provide an improved pad construction which protects the shoulder, clavicle, breasts, arms, hands, and circulatory system of the user from damaging shock forces.
7. To provide an improved pad construction which is capable of bearing both compression and shear forces.
8. To provide an improved pad construction wherein the fluid system is comprised of a multiplicity of members.
9. To provide an improved pad construction which provides essentially permanent, unchanging beneficial characteristics to the user throughout the life of the structure to which the pad is attached.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

SUMMARY OF THE INVENTION

Figure 1:
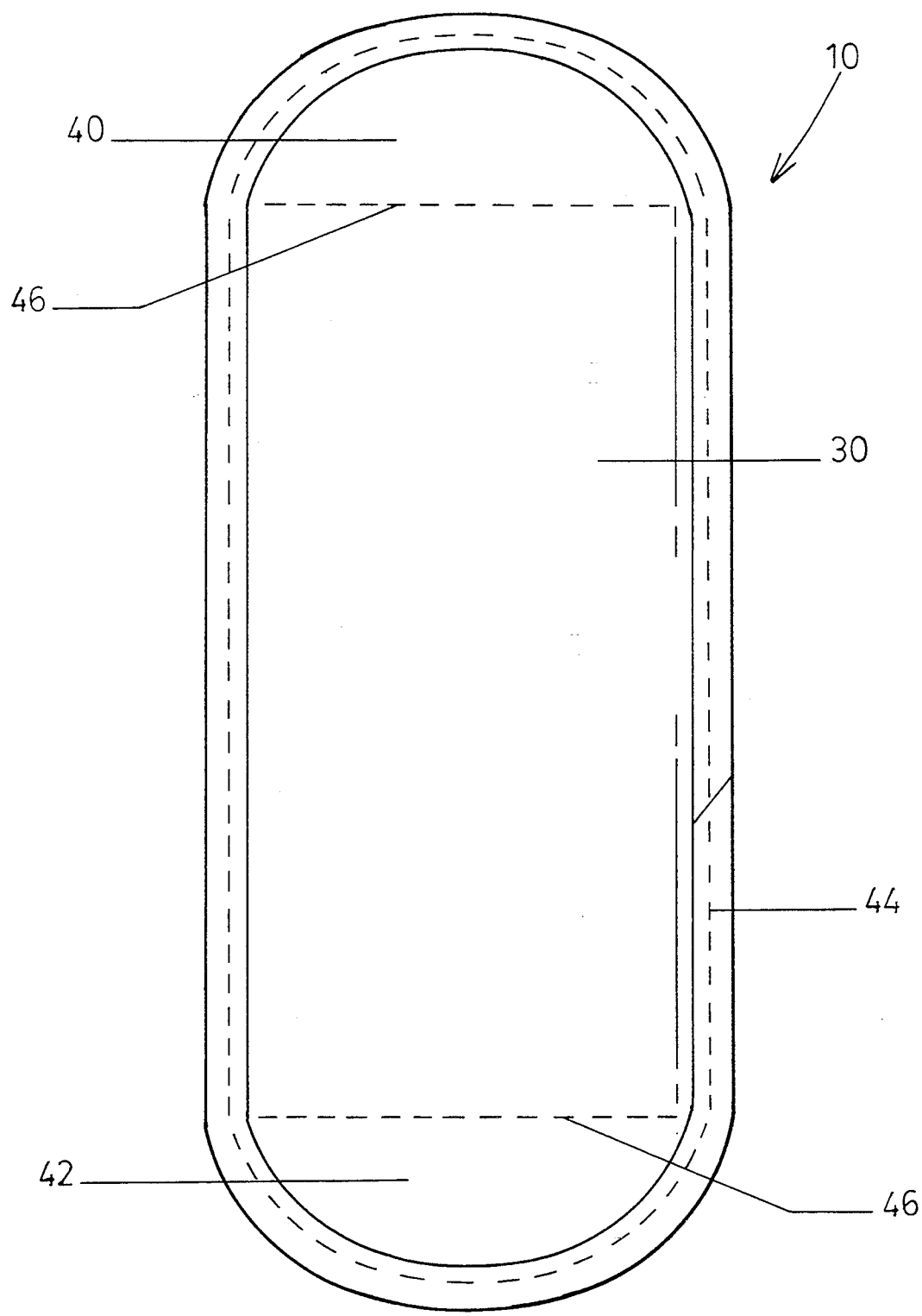
FIG. 1 is a top plan view of a pad embodying the invention, top and bottom plan views are mirror-images.

The present invention is a unique, attenuating pad construction with a gel-encapsulating insert or shock-absorbing member which is adapted for use as a load-supporting pad, such as for a shoulder pad, shoulder strap pad or a handle pad. The gel-encapsulating insert, encased within a pliant sheath, which is provided with extended longitudinal ends, is generally broad and designed to extend longitudinally in a substantial manner. The insert or shock-absorbing member comprises two layers of elastomeric material which encapsulates a longitudinally extended, essentially wide gel shock-absorbing material and is sealed together along a continuous peripheral seam. The gel shock-absorbing material comprises a gel having a cone penetration between 100 and 350 ($10^{-1}$ mm) and a minimum elongation of at least 100%.

According to one embodiment of the invention, the load-supporting pad structure described above is adapted to function as an independent shoulder pad which can be secured by conventional means to the shoulder portion of a garment for use in such contact sports as football, soccer, rugby, hockey and the like. In this capacity, the longitudinal axis of the gel-encapsulating cushioning device is to be so positioned as to absorb and distribute localized physical impact/shock thereby reducing injuries and pain. The pad can also be integrated into garments worn by urban cycle couriers, hunters, hikers and mountain climbers to aid in the reduction of stress from shoulder-borne loads. The adaptive cushioning device may also be attached to other shoulder-borne structures such as a video camera.

According to another embodiment of the invention, the load-supporting pad structure described above is adapted to function as a shoulder strap pad. This is achieved by attaching belts or straps, which are secured to a load-bearing structure, to the afore-mentioned longitudinal sheath ends.

Yet, in another embodiment of the invention, the load-supporting structure of the present invention is adapted to function as a handle pad. This is achieved by attaching mated releasable engagement means to the opposite surfaces of the encasing sheath.

In other embodiments, the insert is provided with a plurality of sealed discrete shock-absorbing gel members.

DETAILED DESCRIPTION OF THE INVENTION

As shown in FIGS. 1 to 5, a flexible, substantially elongated, generally broad, attenuating pad construction 10 is adapted for use as a load-supporting pad, such as for a shoulder pad, a shoulder strap pad or a luggage handle pad. The pad construction comprises outer sheath or shell 30, 32 within which is placed a flexible, considerably elongated, relatively wide gel-encapsulating insert or shock-absorbing member 12. Gel-encapsulating insert member 12, with round longitudinal ends 22, comprises an upper layer or sheet member 14 made of elastomeric material, a similarly formed lower layer or sheet member 16 and an intermediate and encapsulated, longitudinally extended, essentially wide gel shock-absorbing material 18. The elastomeric layers 14, 16 surrounding or encapsulating the intermediate shock-absorbing gel 18 are sealed or welded together (e.g., welded as by a radio frequency welding operation) along continuous peripheral seam 20.

The relatively wide configuration of the gel-encapsulating, load-supporting pad structure 10 is significant because it allows the system to provide a broad area for tangential load distribution.

Figure 1A:
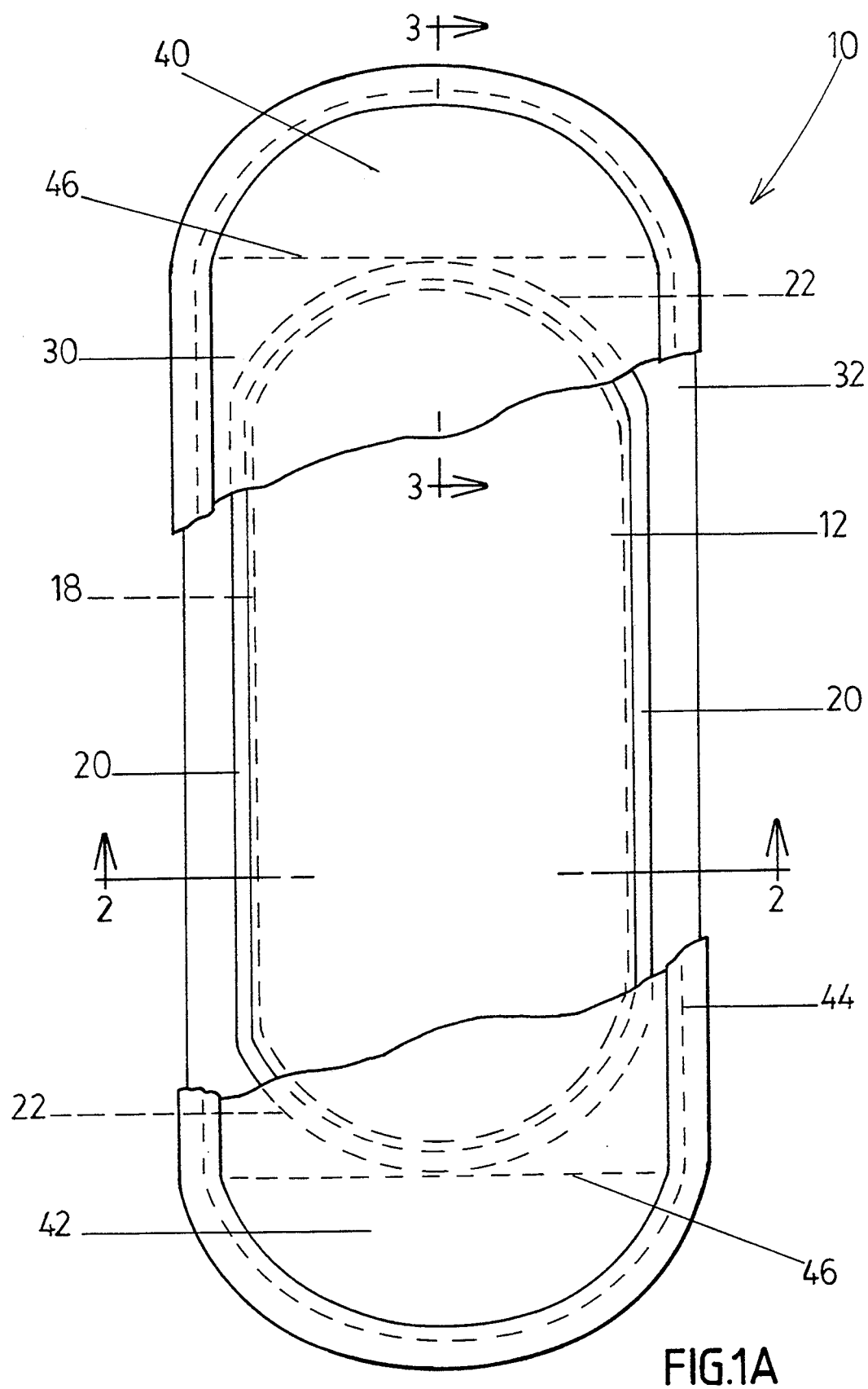
FIG. 1A is a top plan view, with a portion broken away, of a pad embodying the invention (same as FIG. 1) showing the encased gel-encapsulating insert, top and bottom plan views are mirror-images.
Figure 2:
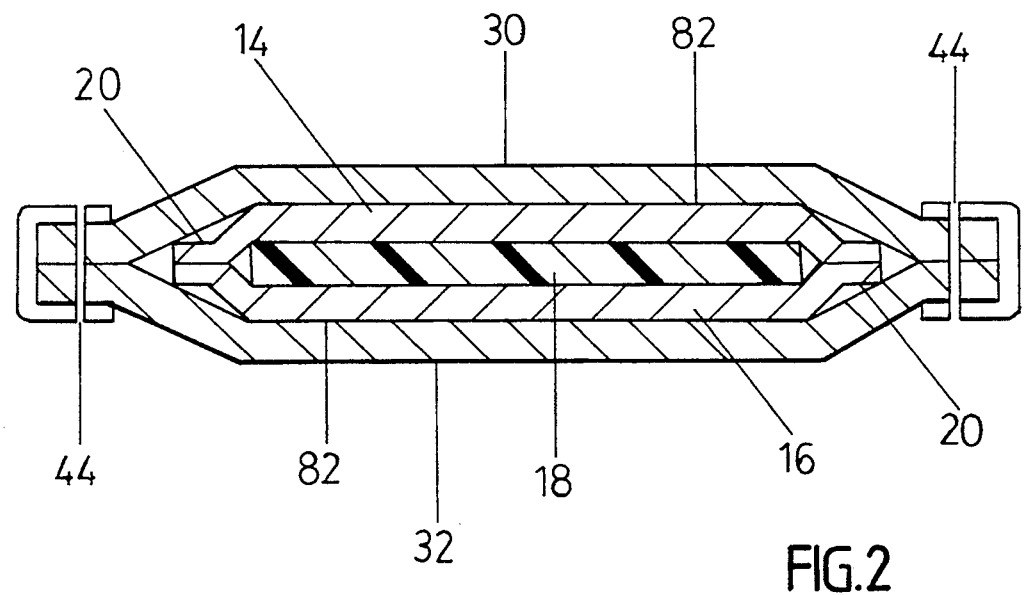
FIG. 2 is an enlarged section taken along the line 2—2 of FIG. 1A, the cushioning insert being made of elastomeric layers or sheet material which encapsulates a gel shock-absorbing layer, and is encased in a pliant sheath.
Figure 3:
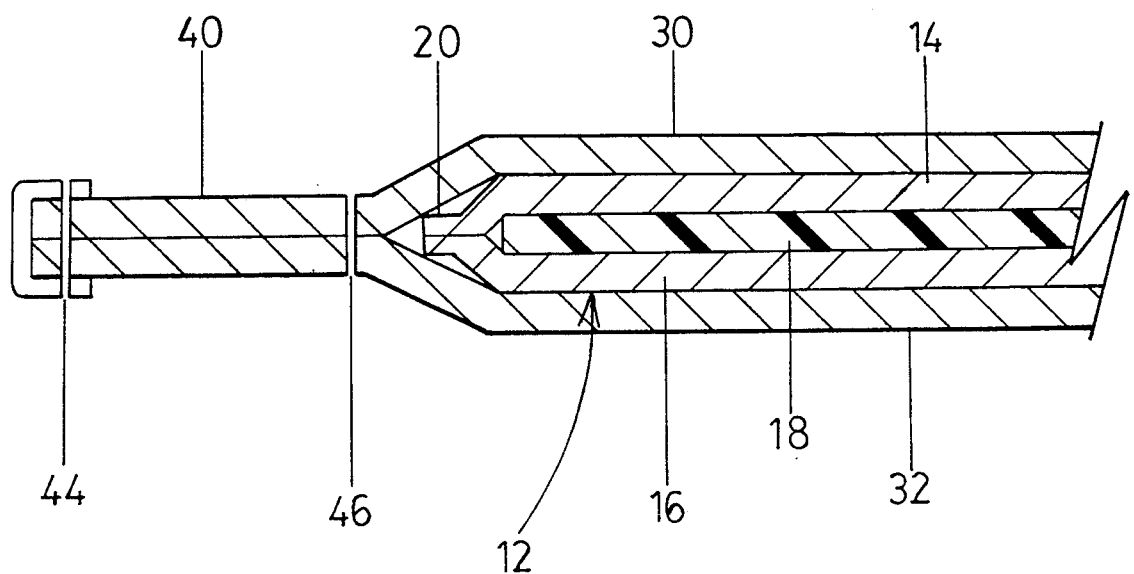
FIG. 3 is an enlarged section taken along the line 3—3 of FIG. 1A.

As shown in FIGS. 1A and 2, the outer sheath or shell comprises a pliant top layer 30 and a pliant bottom layer 32. The encasing layers 30, 32 are appropriately secured together at their continuous outer peripheral edge by peripheral stitches 44 which surrounds the entire structure. As shown in FIGS. 1 through 3, the encasing sheath is extended at its longitudinal ends to form rounded end portions or flanges 40, 42. Posteriorly at these ends, adjacent the longitudinal ends of the encased gel-encapsulating insert 12, sheath layers 30, 32 are fastened together by transverse stitches 46 to form longitudinally delimiting transverse seams. Outer sheath 30, 32 is preferably made of a pliant but strong web or ply such as vinyl, foam-backed vinyl, nylon fabric, i.e., durable PU (polyurethane) coated oxford nylon, webbing or leather.

The longitudinal ends of both the insert as well as its encasing outer sheath are presented as rounded merely for the purposes of illustration. They may, of course, be configured in any desired shape.

To further enhance the stability of the adaptive pad construction, the inner surfaces of the sheath 30, 32 may be provided with an adhesive, along lines 82, so that superposed or cammed surfaces are readily bonded. The gel-encapsulating insert 12 in combination with the encasing sheath forms a unique hydrodynamic spring system which comfortably provides a shock attenuating pad structure.

The pad construction 10 may also function as a shock-absorbing insert pad which can be integrated into garments or body articles and used in the forearm or shin areas.

The material from which the layers of the gel-encapsulating insert is constructed should preferably be elastomeric. Polyurethane film has been found to be particularly useful as the material from which the layers of the insert is constructed. Elastomeric films such as MYLAR and SARAN (PVDC) are considered effective gel-encapsulating materials. The material of the insert may be reinforced with cloth or fibers, and may be laminated with other material to achieve better overall characteristics. In addition, the construction material must lend itself to sealability so that permanent seals between insert layers or sheets can be achieved.

The gel shock— or load-absorbing material 18 most preferably comprises a gel of any of the types well-known in the elastomer fabrication art, such as gel sheets or tapes cross-linked from Uniroyal Chemical Company's ADIPRENE, a synthetic elastomer derived from linear polyurethane, specifically the ADIPRENE L prepolymers (a series of liquid urethane elastomers), or Dow Corning Corporation's silicone elastomers and gels, or other types of liquid elastomers available from E.I. DuPont De Nemours and Company. The gels cured from the preceding liquid elastomers have been used in varying arts to provide environmental or other protection of substrates.

Fabricators of polymers can control the amount of cross-linking (lower curative, higher cross-linking), and hence type of gel, by adjusting the ratio of curative to prepolymer. When using liquid prepolymers, the reactants includes the polymer and one or more chain extenders, for instance, the chain extension, with a diol, of a polyurethane liquid isocyanate terminated prepolymer will produce a soft polyurethane polymer. Cured gels provide much of the tension relief and self healing properties of a liquid while developing much of the dimensional stabilities of an elastomer.

When gel sheet 18 is derived from ADIPRENE, a liquid urethane, it offers high load-bearing capacity, wide range in penetration value, high tensility and high elongation as some of its most desirable qualities. In addition, because of its high strength, flexural capacity and resiliency, ADIPRENE can be practically utilized in thin sections to provide good damping quality, full saturation and retention of elastomer qualities at high penetration values. Another important characteristic is the more or less wide temperature range (between about $-50$ and 121 degree Centigrade) within which ADIPRENE the suggested amortizing or damping elastomer gel for the present invention works.

The gel sheet or layer 18 useful in the present invention can comprise a urethane, silicone or non-silicone liquid with low or no unsaturation which has been cross-linked or chain-extended to provide a gel having a cone penetration between about 100 and 350 ($10^{-1}$ mm) and an ultimate elongation of at least about 100% as measured in accordance with American National Standard Designation ASTM-D217 and ASTM-D638, respectively. Preferably, the cone penetration is between about 125 and 325 ($10^{-1}$ mm), and more preferably between 150 and 300 ($10^{-1}$ mm).

Preferably, the elongation is at least about 200% and more preferably at least about 500%.

Gels with the above properties are used in the present invention because they have shock-absorbing capability—the ability to achieve maximum energy dissipation that cannot be obtained with, for instance, elastomeric foam materials which have low rebound capability and less absorbing of shock waves, and they are easier to handle and contain in the desired shape and position than damping fluids. Furthermore, the shock—or load-absorbing capacity of this gel may be varied by varying the hardness, i.e., cone penetration, of the incorporated gel. For instance, the level of cone penetration (hardness) for support pads for varying load-bearing structures could be made to be duty-cycle/intended-load specific so that different levels of cone penetration would be ideal for the varying applications. In the field of orthotic braces, the present invention finds particular utility in that it may be adapted to suit individual needs of the patient.

The gels used in the present invention are of the very soft kind. A gel having a cone penetration between about 100 and about 350 ($10^{-1}$ mm) is very soft. These shock-absorbing gel materials are comparable to grease or petroleum jelly in softness or cone penetration, but do not behave as grease because of the high elongation and other elastomeric properties of the gel. The inventive structure achieves its unique cushioning and shock-absorbing and load-bearing capacity by utilizing the well-known characteristic of uniform and instantaneous distribution of pressure in a fluid medium. Therefore, compared to the gels of the present invention, conventional elastomers and rubbers are too hard to absorb and dissipate shocks effectively.

Furthermore, the absence of elastomeric qualities in liquids, greases and viscous fluids makes them ineffective in absorbing or dissipating shocks in a pad structure. This is because of their high motility and permanent deformation, allowing them to recede from areas of impact. In use the enclosed gel material is pressed into conformance with the surrounding compressive material and yields in proportion to the applied longitudinal force. The gel center in effect forms a hydrodynamic spring layer which in combination with the surrounding compressive material resiliently and comfortably absorbs tangential loads. It is the distinctive combination of properties of extreme softness, cone penetration 100 to 350 ($10^{-1}$ mm), and the high elongation, at least 100%, that enables the gels of this invention to effectively absorb/dissipate shocks in thin sections or layers. This combination enables the softness of the gel to absorb and dissipate shocks by dispersing the energy by deforming the gel, while at the same time, the high elongation of the gel provides the resilience to recover the gel to its original shape without permanent deformation.

The specific thickness of the shock-absorbing gel material to be used in the present invention will be apparent to those skilled in the art following the disclosure and embodiments herein. In principle the gel material should be thick enough to substantially provide shock-absorbing and load-bearing capacity to a pad structure.

Figure 4:
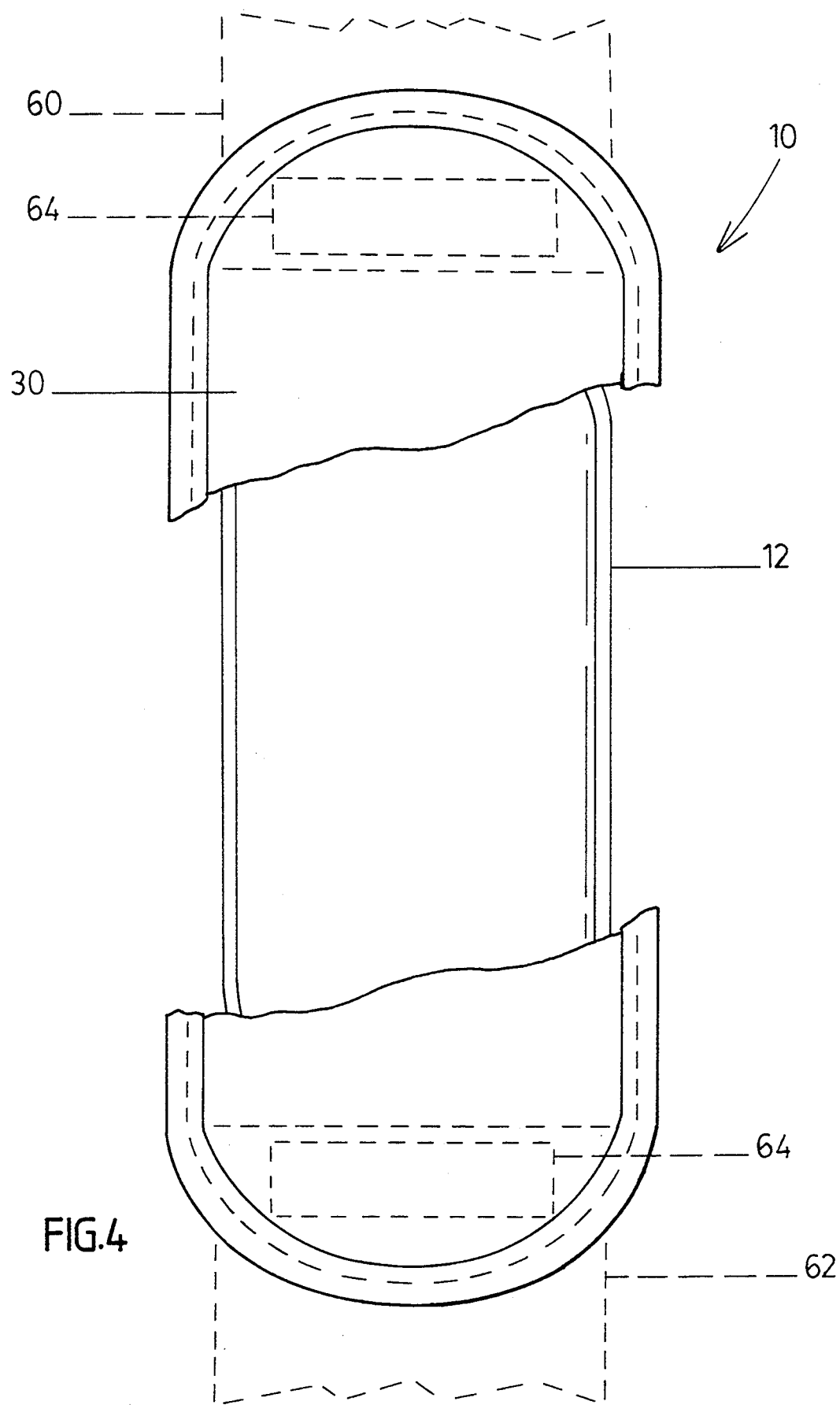
FIG. 4 is a top plan view, with a portion broken away, of a pad embodying the invention (same as FIG. 1) showing the encased gel-encapsulating insert and showing in broken or phantom lines, belts connected to the extended longitudinal ends (flanges) of the pad structure.

The adaptation of the inventive pad as a shoulder strap pad is shown in FIG. 4. Strap elements 60, 62 are secured to the overlying, extended longitudinal sheath ends 40, 42 by rectangular stitches 64. The straps or webbings 60, 62 are connected to a load-bearing structure. The combination of the straps 60, 62 and the pad construction 10, which now forms a flexible, elongated, generally broad, intermediate cushioning pad, provides a unique shock-absorbing system which efficiently distributes the load attached to the straps, eliminating discomfort in the shoulder area.

Figure 5:
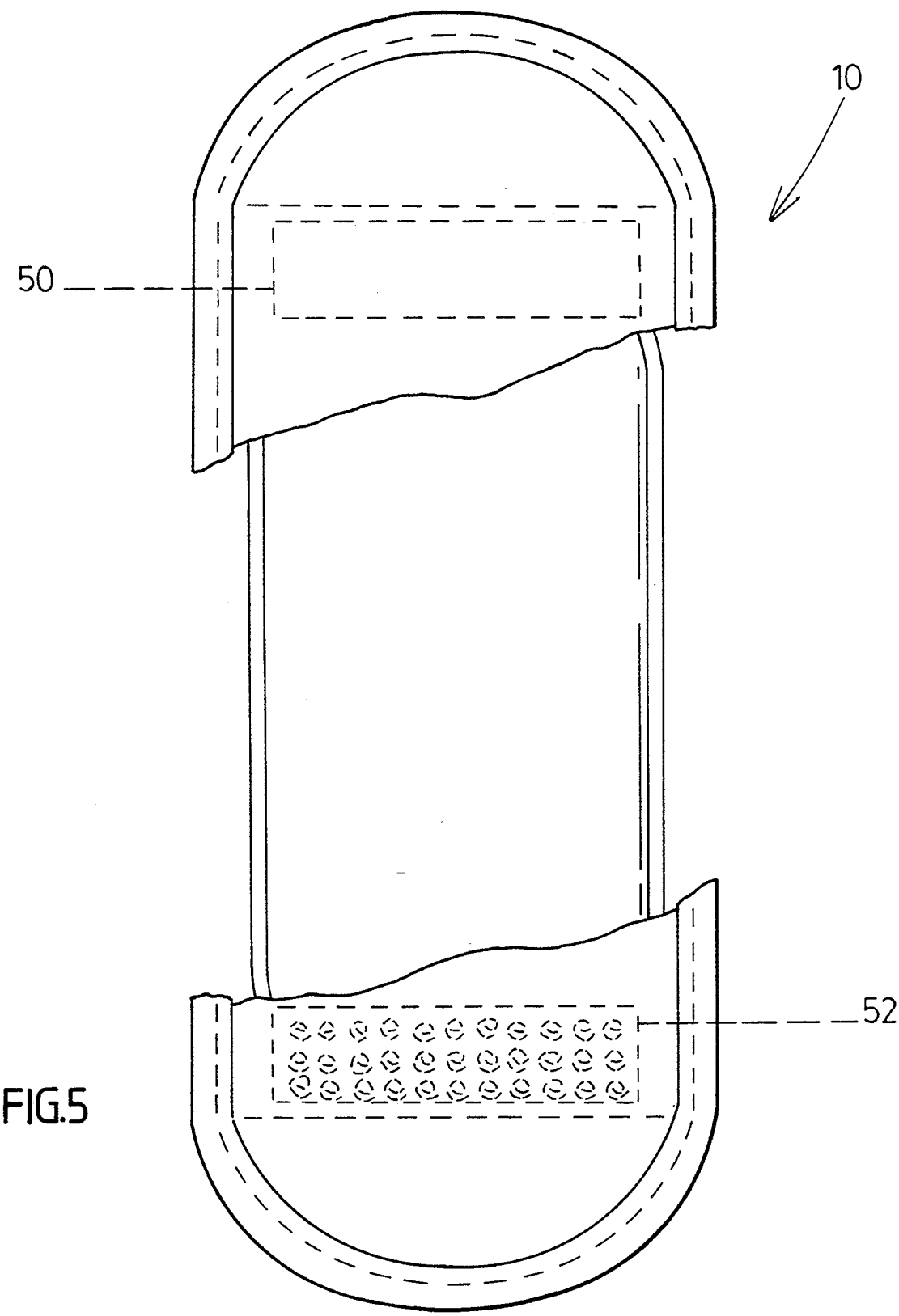
FIG. 5 is a top plan view, with a portion broken away, of a pad embodying the invention (same as FIG. 1) showing the encased gel-encapsulating insert and showing in broken or phantom lines, opposing, mated releasable engagement members, i.e., velcro, for use when the pad invention is used as a shock-absorbing pad for luggage handles.
Figure 6:
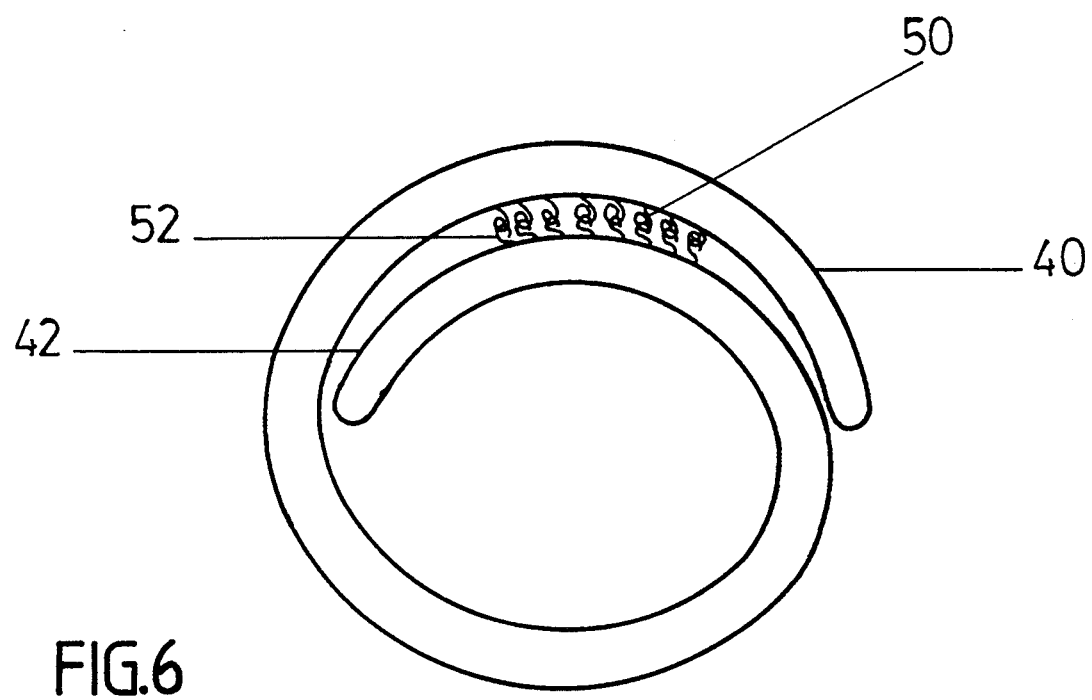
FIG. 6 is an elevated, schematic side view of a pad embodying the invention folded over to engage releasable engagement members, i.e., velcro, when used as a handle pad.

FIG. 5 illustrates the handle pad embodiment of the present invention. As in conventional handle pads, a pair of releasable engagement means 50, 52, such as velcro strips, are secured to the opposite outer surfaces of sheath 30, 32, adjacent the sheath's transverse seams. When the gel-encapsulating handle pad is folded over a handle, the mated fastening strip pair 50, 52 are pressed together to secure the pad (see FIG. 6). The longitudinal as well as lateral aspects of the present invention may be further extended so as to provide enhanced shock attenuation for longer or bigger handles.

Figure 7:
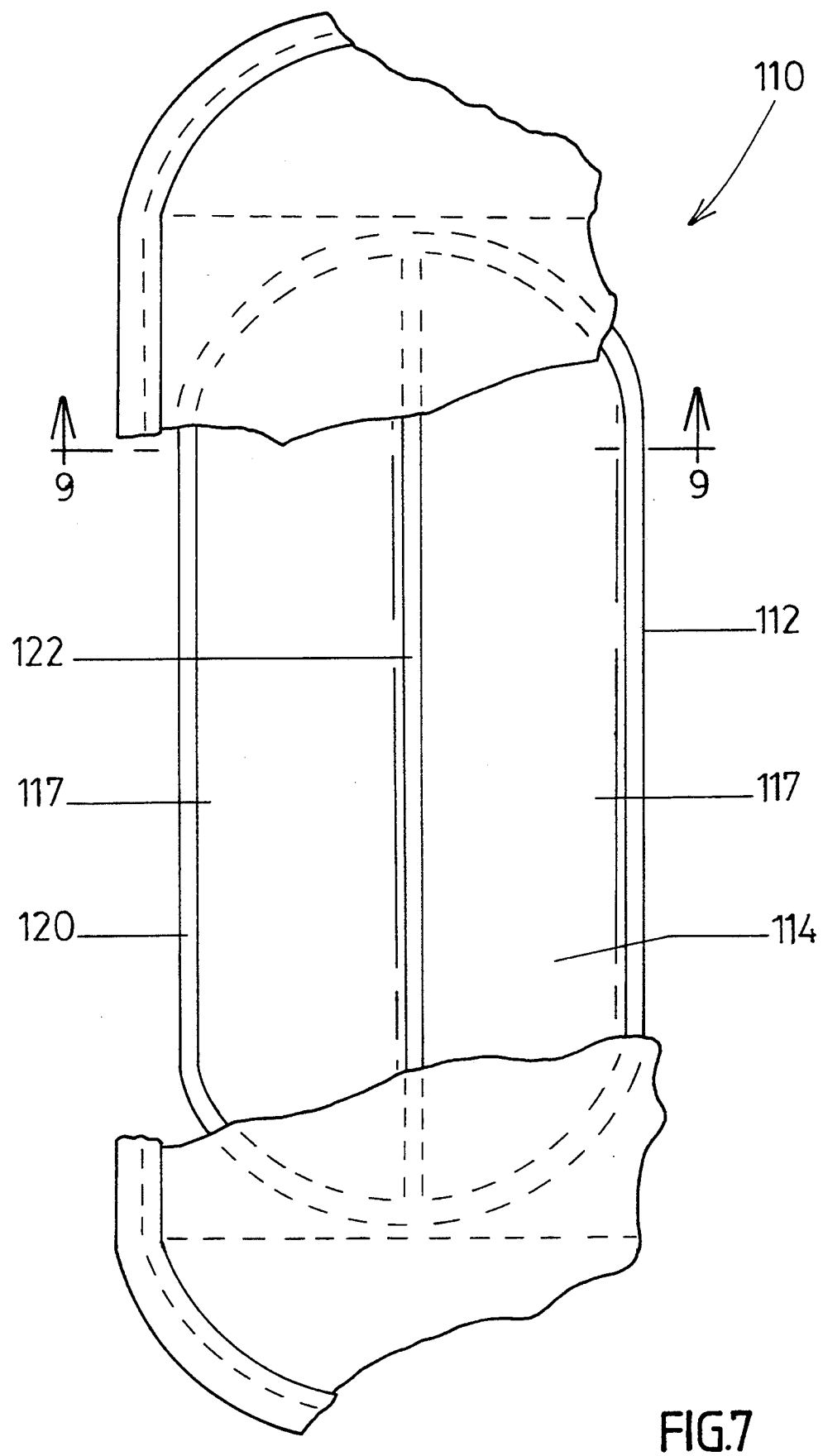
FIG. 7 is a top plan view, with a portion broken away, of another embodiment of the gel-encapsulating insert, encased within the same sheath as in FIG. 1/1A, top and bottom views are mirror-images.
Figure 9:
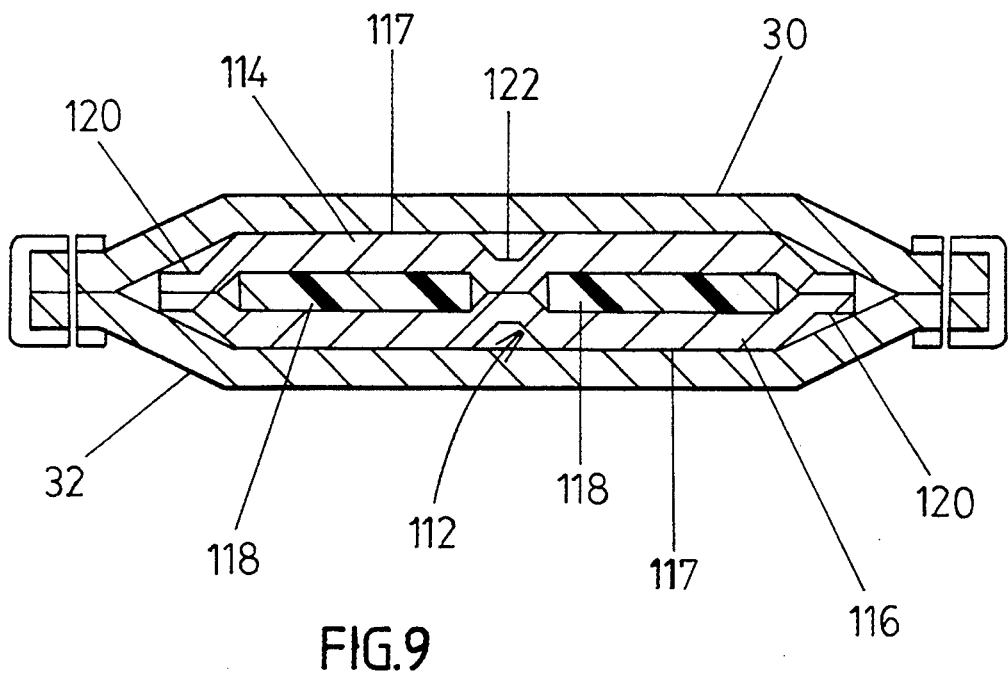
FIG. 9 is an enlarged section taken along the line 9—9 of FIG. 7.

FIGS. 7 and 9 illustrate a different embodiment of a gel-encapsulating, shock-absorbing member or insert 112 of pad construction 110 of the present invention. The gel-encapsulating insert 112 includes two, spaced, lengthwisely extended, sealed sections or compartments 117 which encapsulate longitudinally extended, shock-absorbing gel members 118 which are defined by longitudinal weld line 122. As in the case of the insert 12, insert 112 is formed, after the intermediate gel strips have been properly ensconced, by welding, as by a conventional radio frequency welding operation, two sheets or layers 114 and 116 of flexible, considerably elongated, round-ended, relatively wide material, e.g., polyurethane, along a continuous peripheral seam 120 and weld line 122. Insert 112 is encased, as with embodiment 12, in sheaths 30, 32 and thus provided with all its attendant features.

Figure 8:
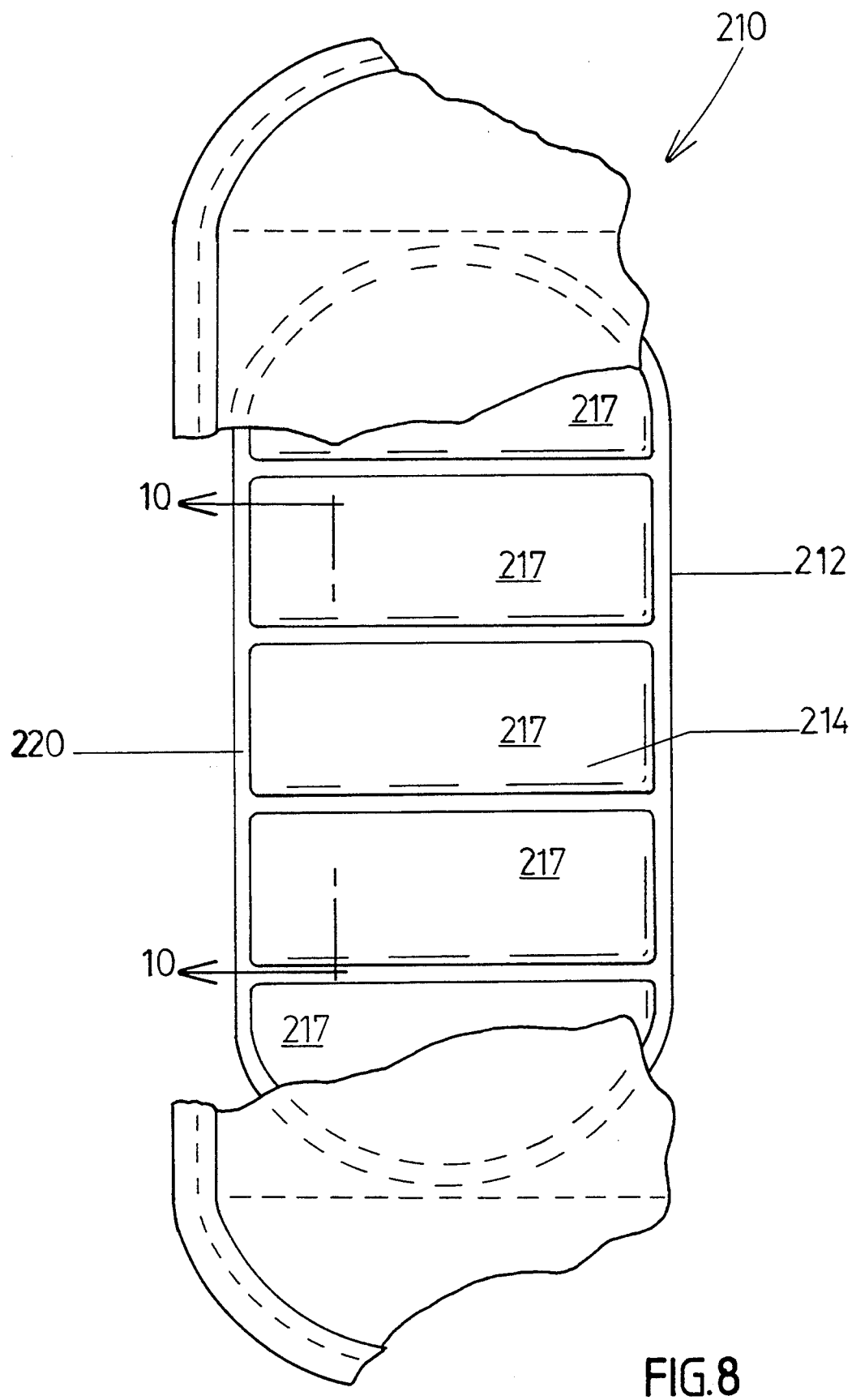
FIG. 8 is a top plan view, with a portion broken away, of yet another embodiment of the gel-encapsulating insert, encased within the same sheath as in FIG. 1/1A, top and bottom plan views are mirror-images.
Figure 10:
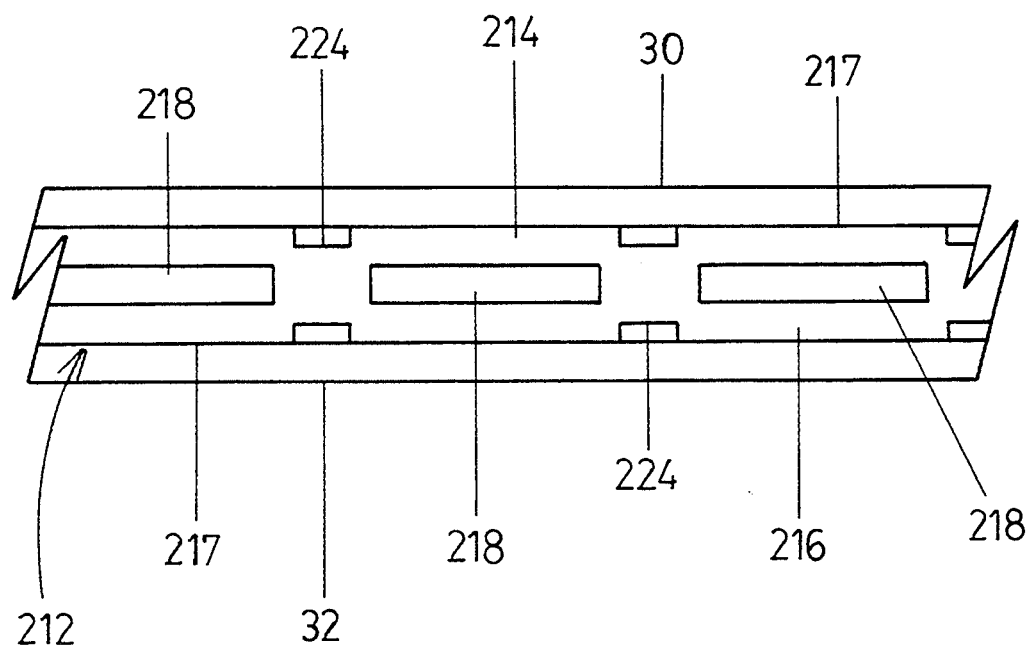
FIG. 10 is schematic section taken along the line 10—10 of FIG. 8.

FIGS. 8 and 10 show another embodiment of a gel-encapsulating insert or shock-absorbing member 212 of pad construction 210 of the present invention. Insert 212 includes a plurality of spaced, latitudinally extended, sealed sections or compartments 217, 217 . . . 217 which encapsulate latitudinally extended, gel shock absorbing strips 218, 218 . . . 218. As in the case of insert 12, insert 212 is formed, after the intermediate gel strips have been properly ensconced, by welding, as by a conventional radio frequency welding operation, two sheets or layers 214 and 216 of flexible, considerably elongated, round-ended, relatively wide material, e.g. polyurethane, along a continuous peripheral seam 220 and generally transverse welds 224, 224 . . . 224. As in the case of the embodiment of FIG. 1, insert 212 is encased in sheath 30, 32 and thus provided with all its attendant features.

Figure 11:
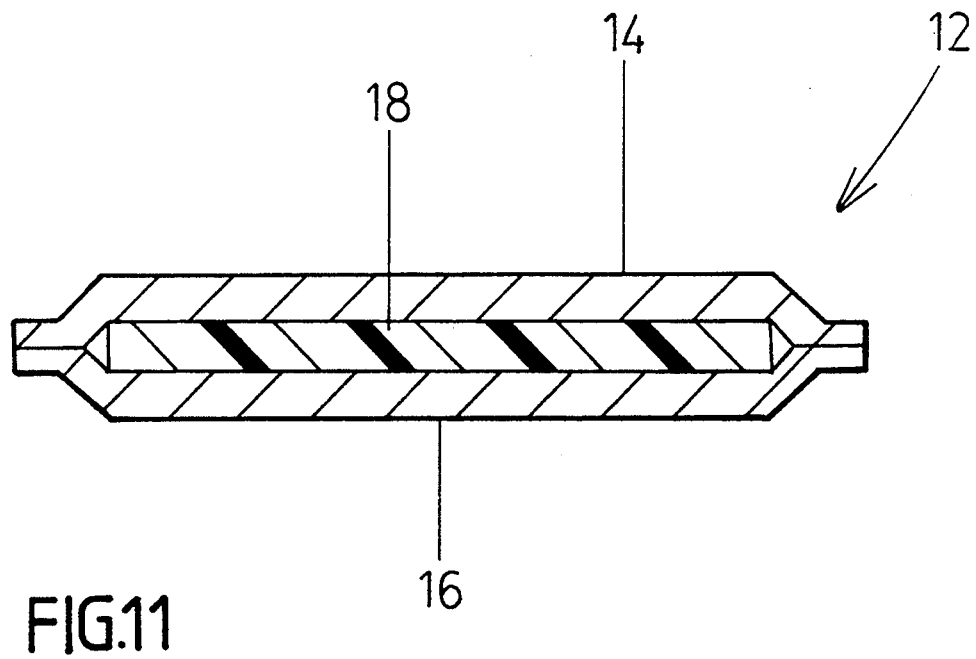
FIG. 11 is an enlarged cross-section of a gel-encapsulating insert of the invention, similar to FIG. 2 but without the outer sheath, disclosing the self-contained nature of the cushioning device.
Figure 12:
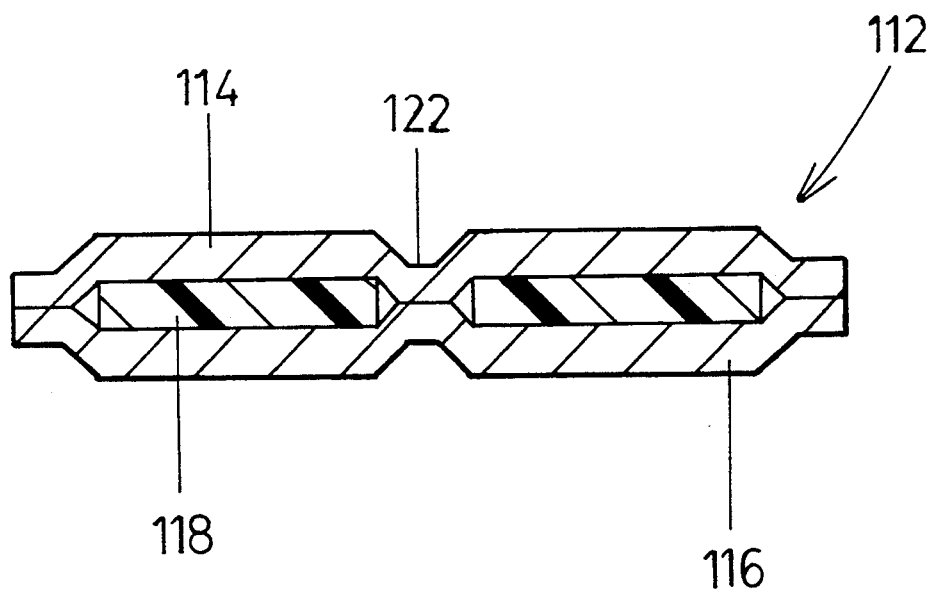
FIG. 12 is an enlarged cross-section of a gel-encapsulating insert of the invention, similar to FIG. 9 but without the outer sheath, disclosing the independent nature of the cushioning device.

The sheath 30, 32 is preferably (but not necessarily) provided as an integral part of the pad system in which the insert construction of the present invention is incorporated. It is contemplated (FIGS. 11 and 12) that it may be desirable to utilize the insert(s) without a sheath, particularly when used as a body pad, in which case, the insert(s) would be placed within a garment receptacle or pocket.

Figure 13:
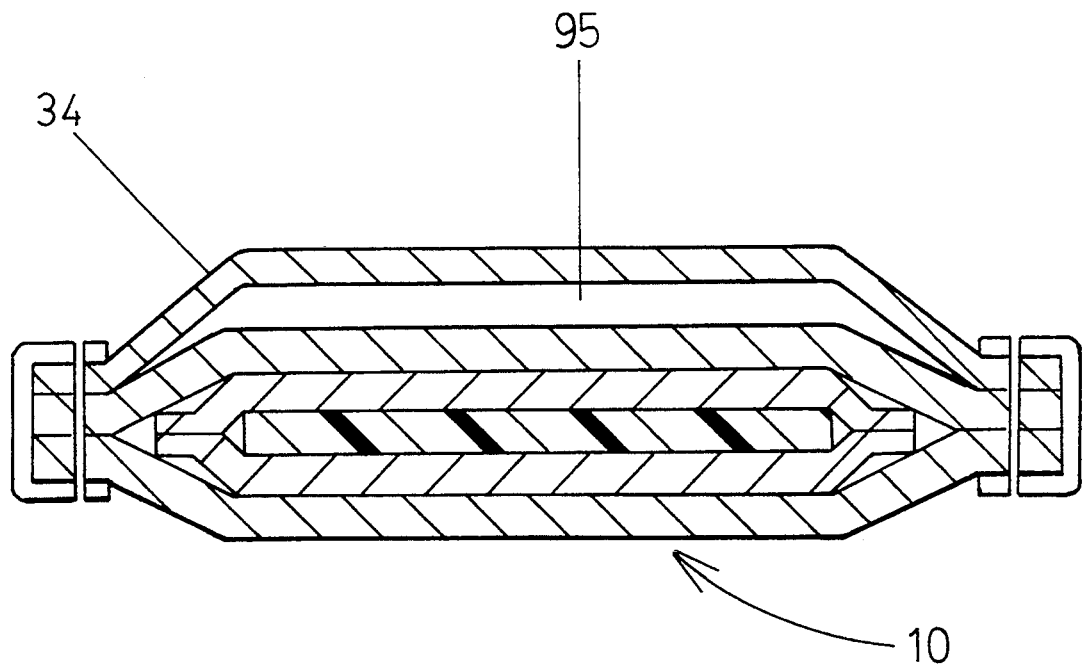
FIG. 13 is an enlarged cross-section of a pad embodying the invention, similar to FIG. 2, with a pliant superposed loop member.

FIG. 13 illustrates another mode of adapting the attenuating pad of the present invention to function as a shoulder pad structure. Essentially in this embodiment, construction 10, with its gel-encapsulating insert member 12, is provided with a pliant, strong, wide, superposed and longitudinally extended loop member 34. Loop member 34 is preferably of the same material as sheath layers 30, 32 and appropriately secured along its lateral edges by stitches 44. The incorporation of a loop member to the sheathing structure allows for the slidable attachment of a strap or a belt, through longitudinal space 95, to the pad of the present invention.

Figure 14:
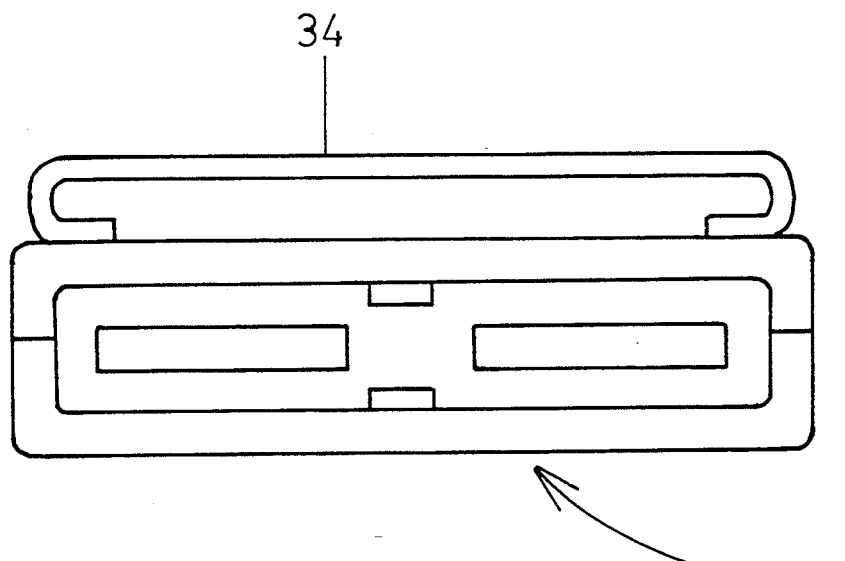
FIG. 14 is a schematic cross-section of a pad embodying the invention, similar to FIG. 9, with a pliant superposed loop member.

The same looped pad construction is shown in FIG. 14. This time loop 34 is attached to the heretofore described pad construction 110 of the present invention.

Figure 15:
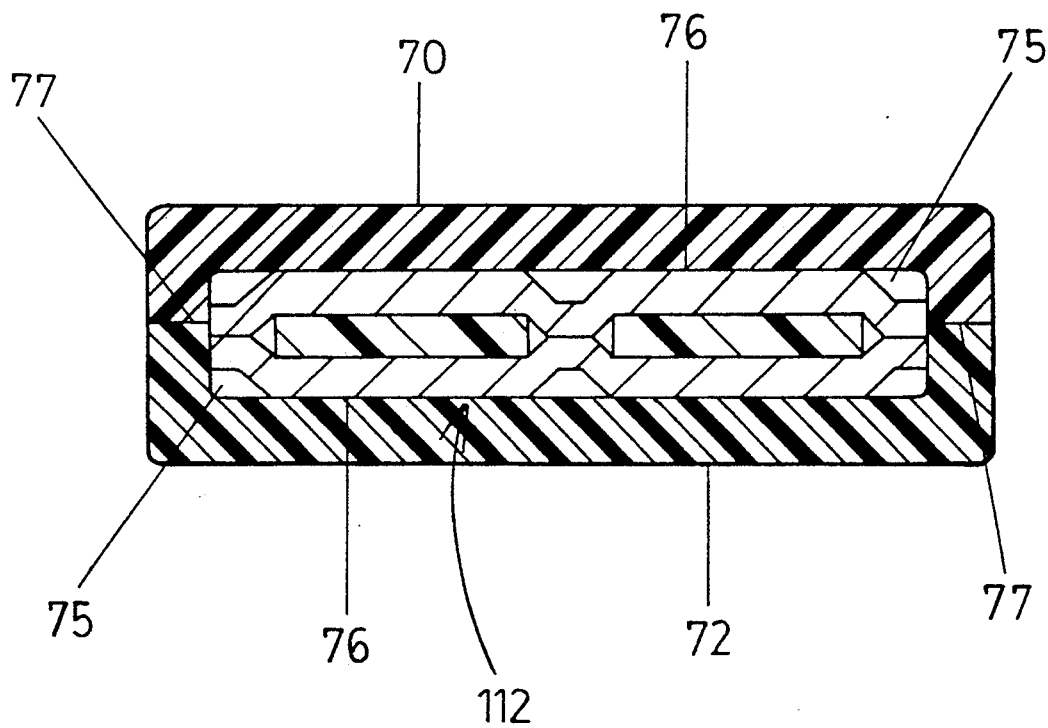
FIG. 15 is an enlarged, cross-section of another embodiment of the invention disclosing a gel-encapsulating insert, similar to FIG. 12, encased within or surrounded by foam members.

FIG. 15 shows another form of encasement for the attenuating insert or cushioning member 112 of the present invention. In this embodiment, the gel-encapsulating, elastomeric insert 112, is encased in preformed elastomeric foam, made of upper and lower layers 70, 72. The preformed, longitudinally extended, generally broad upper and lower foam members 70, 72 are formed by injection molding them in suitable dies (not shown). The encasing foam members are provided with interior cavities 75 for the containment of the gel-encapsulating insert in an enveloping and intimately contacting manner. Once the insert has been properly ensconced, the two parts of the encasing, longitudinally extended and generally broad foam members are then moved toward each other and are sealed to one another, by a suitable cement or other bonding process, along their continuous, superimposed seam 77; thus, a composite foam encased/gel-encapsulating pad structure is formed. The internal cavities may be provided with an adhesive element, along lines 76, to assist in the containment of the insert structure.

The advantage of the separate molding of the insert encasing members is that the foaming process can take place without temperature limitations since the injection molding step is preformed in a suitably designed die out of contact with the gel-encapsulating insert element.

Figure 16:
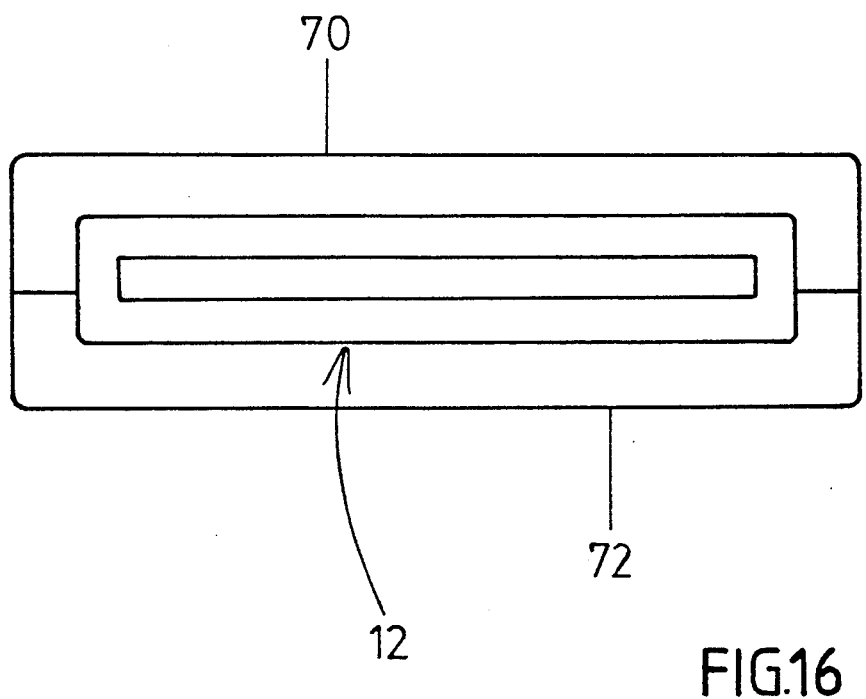
FIG. 16 is schematic cross-section of another embodiment of the invention disclosing a gel-encapsulating insert, similar to FIG. 11, encased within or surrounded by foam members.

The same foam encasement concept is shown in FIG. 16. This time insert embodiment 12 is encased by foam parts 70, 72. In both instances, the encasing members are deformable to transfer the load imposed upon them to gel-encapsulating insert 12 or 112.

As part of the handle pad adaptation of the present invention, the foam encased, gel-encapsulating, load-supporting construction of the present invention can be used as a hand-rest pad for use at home or at work by writers, architects, graphic artists, secretaries, and computer users.

The phenomenon "carpal tunnel syndrome", otherwise known as repetitive motion syndrome, is a health risk factor that can be mitigated by incorporating the foam encased, gel-encapsulating, load-supporting pad structure of the present invention as part of a worker's table top accoutrement. The inventive pad may be used as a hand rest, particularly when using the computer mouse device, thereby significantly decreasing the occurrence of hand/arm numbness, pain, reduced movement or mobility and stiffness.

The encasement of the gel-encapsulating insert pad of the present invention within elastomeric foam, i.e., neoprene, allows the designers/manufacturers the capacity to further customize the impact-dissipating or ameliorating effect of the elastomeric foam encased/gel-encapsulating insert pad structure. It is contemplated that this can be achieved by varying the densities of the two layers of encasing foam members. In this method, the upper layer may be comprised of a higher density/lower compression material, such as denser urethane foam, than the lower layer which is comprised of a softer, more compressive material. For instance, variable density resins are available under the trademark RUBATEX, a closed-cell polymer sponge sheet material, which is produced by the Rubatex Corporation of Bedford, Va.

Figure 17:
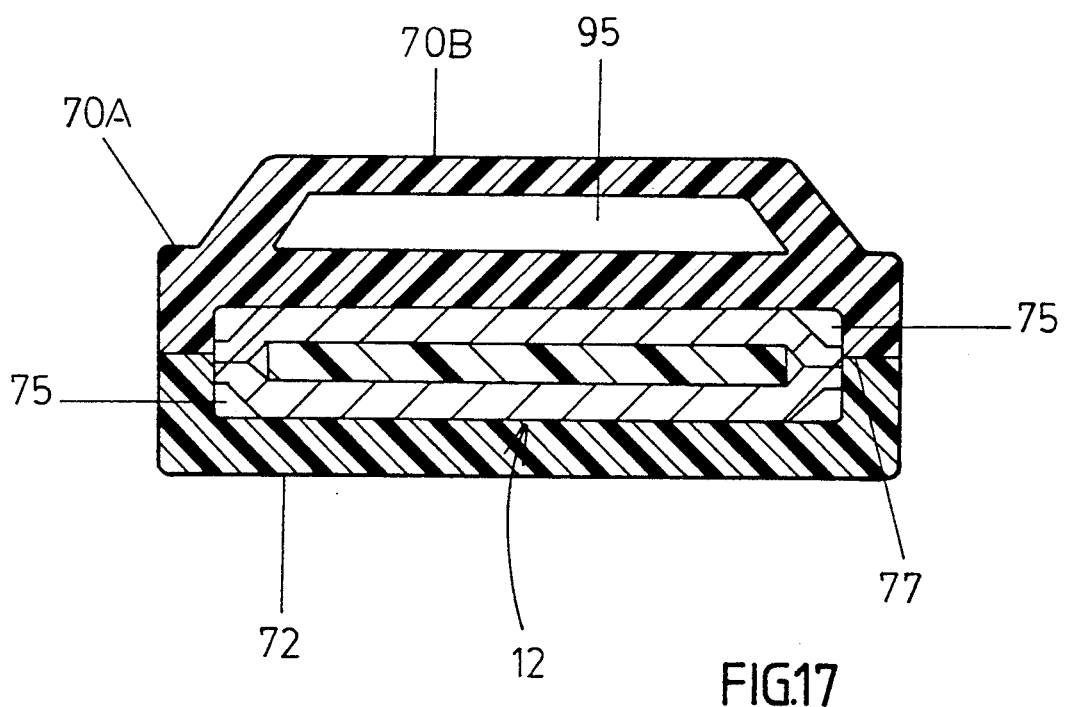
FIG. 17 is an enlarged cross-section of a further embodiment of the invention, similar to FIG. 16, with an integral, superposed loop member.

FIG. 17 shows another form of the foam encasement configuration of the attenuating pad structure of the present invention. In this embodiment, gel-encapsulating elastomeric insert 12 is encased in preformed, longitudinally extended, generally broad elastomeric foam parts 70A/B, 72 with interior cavities 75 for the containment of the insert. Loop member 70B of upper foam member 70A is an integral, superposed, substantially co-extensive member. Member 70B, formed from and extending upwardly above the plane of 70A, aids in the maintenance of the shoulder-pad structure in association with a strap, through longitudinal space 95, while permitting the shoulder pad to adjustably slide along the strap for positioning on the shoulder. The internal cavities, as in FIG. 15, may be provided with an adhesive element to assist in the containment of the insert structure.

Figure 18:
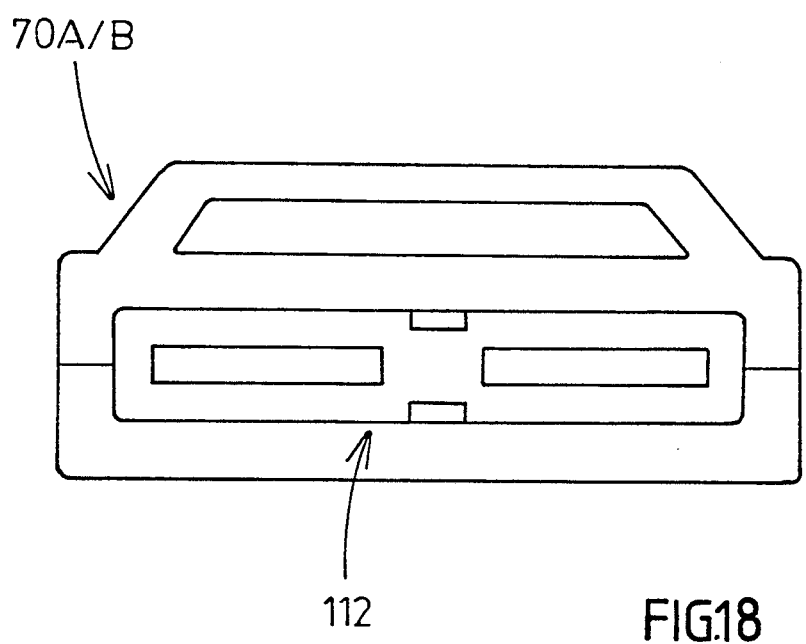
FIG. 18 is a schematic cross-section of a further embodiment of the invention, similar to FIG. 15, with an integral, superposed loop member.

The same looped foam encasement concept is shown in FIG. 18. This time insert embodiment 112 is encased by foam parts 70A/B, 72. In both instances, the encasing members are deformable to transfer the load imposed upon them to the gel-encapsulating inserts 12 or 112.

Figure 19:
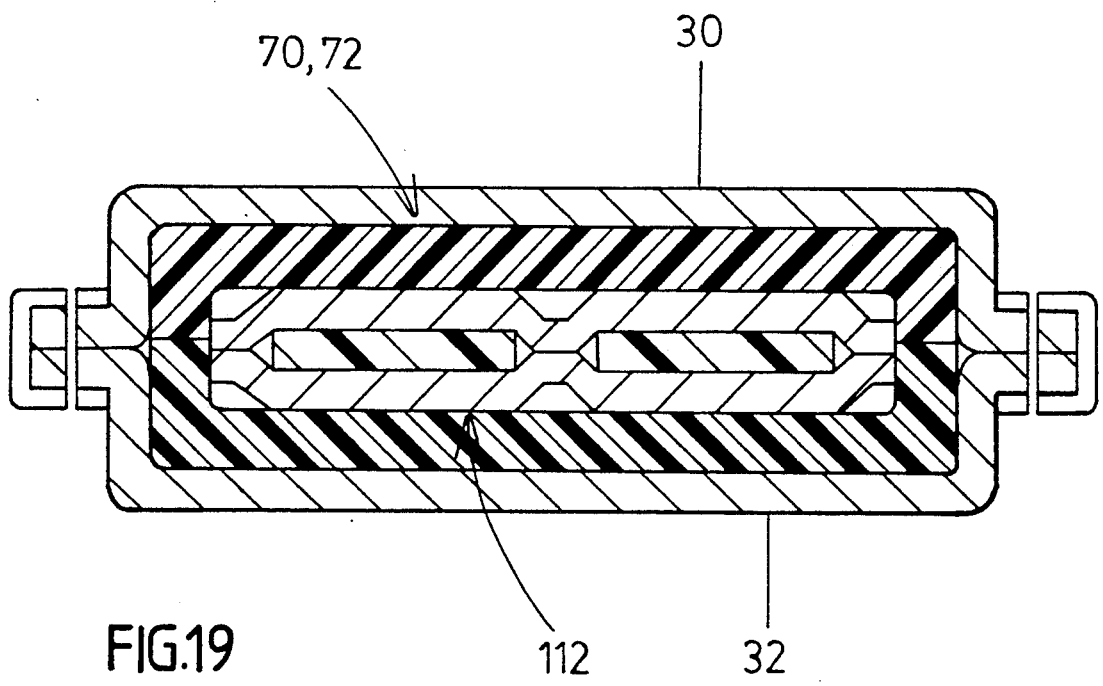
FIG. 19 is an enlarged, cross-section of another embodiment of the invention, similar to FIG. 15, with the outer sheath of FIG. 1/1A.
Figure 20:
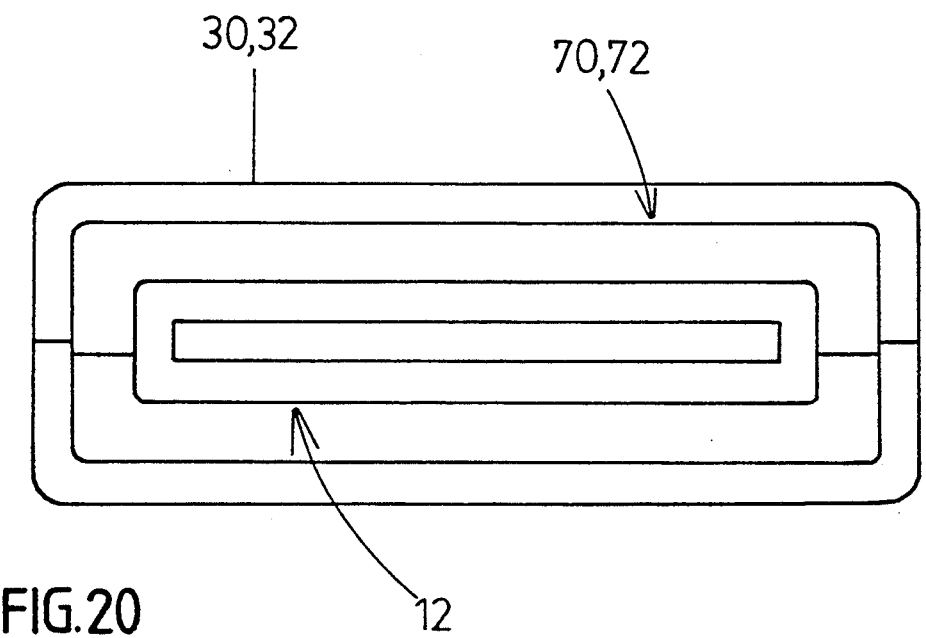
FIG. 20 is a schematic cross-section of another embodiment of the invention, similar to FIG. 16, with the outer sheath of FIG. 1/1A.

It is further contemplated that the foam encased embodiment of FIGS. 15 and 16 may be provided with the adaptive outer sheath layers of the present invention, FIGS. 19 and 20; thus allowing the composite foam encased/gel-encapsulating, load-supporting pad construction to provide a variety of functions, i.e., as a shock-absorbing insert pad for the shoulder, forearm or shin, as an intermediate cushioning structure attachable to shoulder straps, or as a handle pad when a highly yieldable elastomeric casing is used to surround or enclose the gel-encapsulating, shock-absorbing structure.

Finally, it is evident from the foregoing specifications that a gel-encapsulating, load-supporting pad structure constructed in accordance with the principles of the present invention can be manufactured and easily integrated or secured to load-bearing articles without altering their structure or initiating superfluous amendments.

Other embodiments, modifications and extension of this invention will become apparent to those skilled in the art. All such variations which basically rely on the teachings which this invention has advanced are considered within the spirit and scope of this invention.

What is claimed is:

1. A gel-encapsulating, load-supporting pad construction, comprising:

an elongated, relatively wide, sealed, gel-encapsulating insert member having an upper and lower layer of elastomeric material, including an intermediate, gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and a minimum elongation of at least 100 percent;

a pliant, strong, substantially elongated, generally broad and circumferentially secured outer sheath, said sheath having top and bottom layers which longitudinally encases said shock-absorbing member, said sheath having extended longitudinal ends, said extended longitudinal ends being flanges and being posteriorly provided with longitudinally delimiting transverse seams along the longitudinal ends of the encased shock-absorbing member;

said flanges provided with extended straps which are attached to a load-bearing article, said strap elements are secured to the flanges by rectangular stitches.

2. A gel-encapsulating, load-supporting pad construction of claim 1, wherein said shock-absorbing member comprises two layers of elastomeric material sealed to one another along seam lines to define a plurality of generally spaced, gel shock-absorbing strips of material.

3. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and a minimum elongation of at least 100 percent;

a pliant, strong, substantially elongated, generally broad and circumferentially secured outer sheath, said sheath having top and bottom layers which longitudinally encases said shock-absorbing member, said sheath having extended longitudinal ends, said extended longitudinal ends being flanges and being posteriorly provided with longitudinally delimiting transverse seams along the longitudinal ends of the encased shock-absorbing member;

said outer sheath provided with a superposed, longitudinally extending loop member attached along its lateral edges to the sheath longitudinal edges for the slidable attachment of the pad structure to a strap.

4. A gel-encapsulating, load-supporting pad construction of claim 3, wherein said shock-absorbing member comprises two layers of elastomeric material sealed to one another along seam lines to define a plurality of generally spaced, gel shock-absorbing strips of material.

5. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and a minimum elongation of at least 100 percent;

a pliant, strong, substantially elongated, generally broad and circumferentially secured outer sheath, said sheath having top and bottom layers which longitudinally encases said shock-absorbing member, said sheath having extended longitudinal ends, said extended longitudinal ends being flanges and being posteriorly provided with longitudinally delimiting transverse seams along the longitudinal ends of the encased shock-absorbing member;

said outer sheath provided with a pair of releasable engagement means on opposite surfaces adjacent said transverse seams of said flanges thus when said pad structure is folded over a handle the releasable engagement means are pressed together to secure said pad.

6. A gel-encapsulating, load-supporting pad construction of claim 5, wherein said shock-absorbing member comprises two layers of elastomeric material sealed to one another along seam lines to define a plurality of generally spaced, gel shock-absorbing strips of material.

7. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350

($10^{-1}$ mm) and a minimum elongation of at least 100 percent;

an elastomeric yieldable outer foam casing longitudinally enclosing said shock-absoring member, said outer casing comprising at least two longitudinally extending preformed foam parts and sealed along their continuous, superimposed, peripheral seam to enclose said shock-absorbing member, and means securing said parts in enclosing relation to said shock-absorbing member;

a pliant, strong, substantially elongated, generally broad and circumferentially secured outer sheath, said sheath having top and bottom layers which longitudinally encases said foam encased, shock-absorbing member, said sheath having extended longitudinal ends, said extended longitudinal ends being flanges and being posteriorly provided with longitudinally delimiting transverse seams along the longitudinal ends of the encased shock-absorbing member;

said outer sheath provided with attachment means on said flanges, said attachment means is an integral, superimposed and substantially coextensive member.

8. A gel-encapsulating, load-supporting pad construction of claim 7, wherein said shock-absorbing member comprises two layers of elastomeric material sealed to one another along seam lines to define a plurality of generally spaced, gel shock-absorbing strips of material.

9. A gel-encapsulating, load-supporting pad construction of claim 7, wherein said pad is used as a shock-absorbing shoulder pad.

10. A gel-encapsulating, load-supporting pad construction of claim 7, wherein said pad is used as a shock-absorbing pad for garments.

11. A gel-encapsulating, load-supporting pad construction of claim 8, wherein said pad is used as a shock-absorbing shoulder pad.

12. A gel-encapsulating, load-supporting pad construction of claim 8, wherein said pad is used as a shock-absorbing pad for garments.

13. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and a minimum elongation of at least 100 percent;

an elastomeric yieldable outer foam casing longitudinally enclosing said shock-absoring member, said outer casing comprising at least two longitudinally extending preformed foam parts and sealed along their continuous, superimposed, peripheral seam to enclose said shock-absorbing member, and means securing said parts in enclosing relation to said shock-absorbing member; said outer casing comprising at least two parts having an upper and a lower foam portion wherein the upper portion is provided with an integral, superposed loop coextensive member which aids in the maintenance of the pad structure in association with a strap while permitting the pad structure to adjustably slide along the strap.

14. A gel-encapsulating, load-supporting pad construction of claim 13, wherein said shock-absorbing member comprises two layers of elastomeric material sealed to one another along seam lines to define a plurality of generally spaced, gel shock-absorbing strips of material.

15. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member;

an elastomeric yieldable outer foam casing longitudinally enclosing said shock-absoring member, said outer casing comprising at least two longitudinally extending preformed foam parts and sealed along their continuous, superimposed, peripheral seam to enclose said shock-absorbing member, and means securing said parts in enclosing relation to said shock-absorbing member;

a pliant, strong, substantially elongated, generally broad and circumferentially secured outer sheath, said sheath having top and bottom layers which longitudinally encases said foam encased, shock-absorbing member, said sheath having extended longitudinal ends, said extended longitudinal ends being flanges and being posteriorly provided with longitudinally delimiting transverse seams along the longitudinal ends of the encased shock-absorbing member;

said flanges provided with extended straps which are attached to a load-bearing article, said strap elements are secured to the flanges by rectangular stitches.

16. A gel-encapsulating, load-supporting pad construction of claim 15, wherein said shock-absorbing member comprises two layers of elastomeric material sealed to one another along seam lines to define a plurality of generally spaced, gel shock-absorbing strips of material.

17. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and a minimum elongation of at least 100 percent;

an elastomeric yieldable outer foam casing longitudinally enclosing said shock-absoring member, said outer casing comprising at least two longitudinally extending preformed foam parts and sealed along their continuous, superimposed, peripheral seam to enclose said shock-absorbing member, and means securing said parts in enclosing relation to said shock-absorbing member;

a pliant, strong, substantially elongated, generally broad and circumferentially secured outer sheath, said sheath having top and bottom layers which longitudinally encases said foam encased, shock-absorbing member, said sheath having extended longitudinal ends, said extended longitudinal ends being flanges and being posteriorly provided with longitudinally delimiting transverse seams adjacent the longitudinal ends of the encased shock-absorbing member;

said outer sheath provided with a superposed, longitudinally extending loop member attached along its lateral edges to the sheath longitudinal edges for the slidable attachment of the pad structure to a strap.

18. A gel-encapsulating, load-supporting pad construction of claim 17, wherein said shock-absorbing member comprises two layers of elastomeric material sealed to one another along seam lines to define a plurality of generally spaced, gel shock-absorbing strips of material.

19. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and a minimum elongation of at least 100 percent;

an elastomeric yieldable outer foam casing longitudinally enclosing said shock-absoring member, said outer casing comprising at least two longitudinally extending preformed foam parts and sealed along their continuous, superimposed, peripheral seam to enclose said shock-absorbing member, and means securing said parts in enclosing relation to said shock-absorbing member;

a pliant, strong, substantially elongated, generally broad and circumferentially secured outer sheath, said sheath having top and bottom layers which encases said foam longitudinally encased, shock-absorbing member, said sheath having extended longitudinal ends, said extended longitudinal ends being flanges and being posteriorly provided with longitudinally delimiting transverse seams adjacent the longitudinal ends of the encased shock-absorbing member;

said outer sheath provided with a pair of releasable engagement means on opposite surfaces adjacent said transverse seams of said flanges thus when said pad structure is folded over a handle the releasable engagement means are pressed together to secure said pad.

20. A gel-encapsulating, load-supporting pad construction of claim 19, wherein said shock-absorbing member comprises two layers of elastomeric material sealed to one another along seam lines to define a plurality of generally spaced, gel shock-absorbing strips of material.

21. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and a minimum elongation of at least 100 percent;

an elastomeric yieldable outer foam casing longitudinally enclosing said shock-absoring member, said outer casing comprising at least two longitudinally extending preformed foam parts and sealed along their continuous, superimposed, peripheral seam having a variable density foam composition wherein said upper portion which is first impacted by an incoming load is made of high density foam and the lower portion is made of a low density foam which is more conformable and comfortable to a body, the variable density foam composition provides a construct which places a softer foam next to the body while placing layers of an intermediate gel cell and a high density foam above;

a pliant, strong, substantially elongated, generally broad and circumferentially secured outer sheath, said sheath having top and bottom layers which longitudinally encases said foam encased, shock-absorbing member, said sheath having extended longitudinal ends, said extended longitudinal ends being flanges and being posteriorly provided with longitudinally delimiting transverse seams along the longitudinal ends of the encased shock-absorbing member;

said outer sheath provided with attachment means on said flanges, said attachment means is an integral, superimposed and substantially coextensive member.

22. A gel-encapsulating, load-supporting pad construction of claim 21 wherein said shock-absorbing member comprises two layers of elastomeric material sealed to one another along seam lines to define a plurality of generally spaced, gel shock-absorbing strips of material.

23. A gel-encapsulating, load-supporting pad construction of claim 21, wherein said pad is used as a shock-absorbing shoulder pad.

24. A gel-encapsulating, load-supporting pad construction of claim 22, wherein said pad is used as a shock-absorbing shoulder pad.

25. A gel-encapsulating, load-supporting pad construction of claim 21, wherein said pad is used as a shock-absorbing pad for garments.

26. A gel-encapsulating, load-supporting pad construction of claim 22, wherein said pad is used as a shock-absorbing pad for garments.

27. A gel-encapsulating, load-supporting pad construction, comprising:

an elongated, wide, sealed, gel-encapsulating insert member having an upper and lower layer of elastomeric material, including an intermedidate gel shock-absorbing material, said elastomeric layers encapsulating said intermediate gel shock-absorbing material and said layers being sealed together along a continuous peripheral seam thus forming a sealed, gel-encapsulating, shock-absorbing member, said gel shock absorbing material comprises a gel having a cone penetration between 100 and 350 ($10^{-1}$ mm) and an minimum elongation of at least 100 percent;

an elastomeric yieldable outer foam casing longitudinally enclosing said shock-absoring member, said outer casing comprising at least two longitudinally extending preformed foam parts and sealed along their continuous, superimposed, peripheral seam having a variable density foam composition wherein said upper portion which is first impacted by an incoming load is made of high density foam and the lower portion is made of a low density foam which is more conformable and comfortable to a body, the variable density foam composition provides a construct which places a softer foam next to a body while placing layers of an intermediate gel cell and a high density foam above;

a pliant, strong, substantially elongated, generally broad and circumferentially secured outer sheath, said sheath having top and bottom layers which encases said foam longitudinally encased, shock-absorbing member, said sheath having extended longitudinal ends, said extended longitudinal ends being flanges and being posteriorly provided with longitudinally delimiting transverse seams along the longitudinal ends of the encased shock-absorbing member;

said flanges provided with extended straps which are attached to a load-bearing article, said strap elements are secured to the flanges by rectangular stitches.

28. A gel-encapsulating, load-supporting pad construction of claim 27, wherein said shock-absorbing member comprises two layers of elastomeric material sealed to one another along seam lines to define a plurality of generally spaced, gel shock-absorbing strips of material.

29. A gel-encapsulating, load-supporting pad construction of claim 27, wherein said pad is attached to women's brassiere.

* * * * *